(No Model.)

C. W. CUTTER.
SNAP HOOK.

No. 501,875. Patented July 18, 1893.

WITNESSES:

INVENTOR
Chas W Cutter
BY
ATTORNEY.

UNITED STATES PATENT OFFICE.

CHARLES W. CUTTER, OF BROOMFIELD, COLORADO.

SNAP-HOOK.

SPECIFICATION forming part of Letters Patent No. 501,875, dated July 18, 1893.

Application filed February 6, 1893. Serial No. 461,271. (No model.)

*To all whom it may concern:*

Be it known that I, CHARLES W. CUTTER, a citizen of the United States of America, residing at Broomfield, in the county of Boulder and State of Colorado, have invented certain new and useful Improvements in Snap-Hooks; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in snap hooks and the object of the improvement is to provide a device of the class stated having a locking instrumentality, whereby the hook cannot be opened except by design.

To this end the invention consists of the features hereinafter described and claimed, all of which will be fully understood by reference to the accompanying drawings, in which is illustrated an embodiment thereof.

Figure 1:
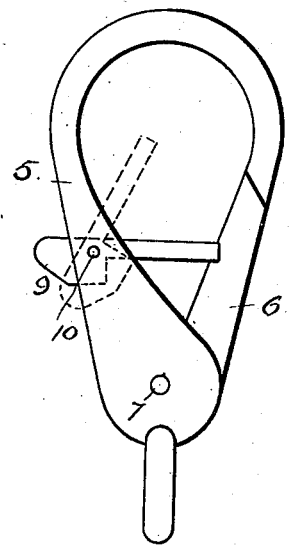
Figure 2:
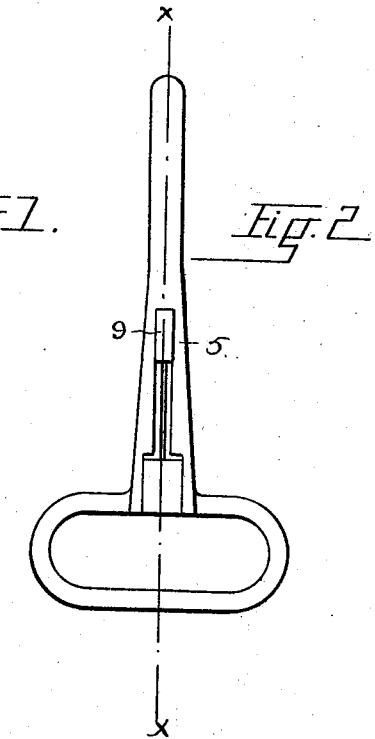
Figure 3:
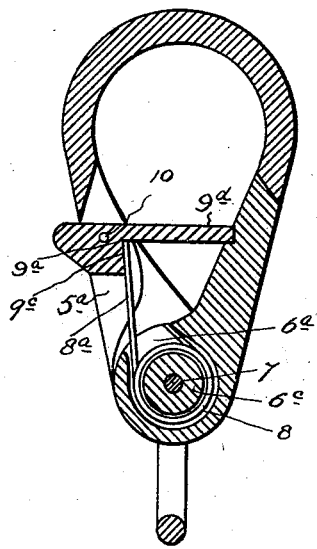
Figures 4, 5:
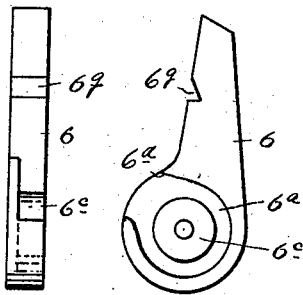

In the drawings, Figure 1 is a side elevation of a snap-hook provided with my improved locking attachment. Fig. 2 is another view of the same. Fig. 3 is a section taken on the line $x$—$x$, Fig. 2. Figs. 4 and 5 illustrate the spring-actuated snap in detail.

Similar reference characters indicating corresponding parts or elements of the mechanism in the several views let the numeral 5 designate the body part of the ordinary device of this class, and 6 the yielding, spring-actuated snap, pivoted on a pin 7 passed through the butt of the body part which is recessed to receive the enlarged extremity of the snap. The snap is grooved as shown at $6^a$ to receive the spring 8 which is coiled around the apertured cylindrical part or barrel $6^c$. One extremity of this spring is engaged by a shoulder $6^d$ formed on the snap, while the other extremity $8^a$ projects into a slot $5^a$ formed in the body of the hook. In this slot is pivoted the locking dog 9 which is apertured to receive the pin 10. This locking dog is shouldered as shown at $9^c$ to engage the extremity $8^a$ of the spring while the reduced extremity $9^d$ of the dog engages a notch $6^g$ formed in the snap 6, and projects preferably at right angles to the longitudinal axis of the device. The enlarged extremity of the dog projects beyond the body of the hook to enable the user of the device to press upon said projection and turn the dog on its pivot when it is desired to unlock the snap. This movement of the dog places the spring under tension which returns the dog to the locking position as soon as it is released from said pressure.

Having thus described my invention, what I claim is—

1. As an improved article of manufacture, the snap hook composed of the hooked body part recessed to receive the snap which is pivoted to the butt thereof, and the spring actuated dog pivoted on the body of the device and normally engaging the snap which it locks from movement, substantially as described.

2. As an improved article of manufacture, a snap-hook composed of the hook, the snap and the locking dog, the body of the hook being recessed to receive the snap and the dog, which are pivoted therein, the butt of the snap being grooved to receive a coil-spring, one extremity of which bears against the snap, while the other extremity engages a shoulder formed on the pivoted dog, whereby the latter normally locks the snap from movement, substantially as described.

3. As an improved article of manufacture, the snap-hook composed of the body part, the snap and the locking dog, the body part being recessed to receive the snap and the dog which are pivoted therein, the snap being recessed to receive a coil spring, the extremities of which engage the snap and the dog respectively, the latter being provided with a projection exterior to the body of the device, whereby it may be manipulated in unlocking the snap, substantially as described.

In testimony whereof I affix my signature in presence of two witnesses.

CHARLES W. CUTTER.

Witnesses:
WM. MCCONNELL,
H. J. HOWZE.